United States Patent
Goder et al.

(10) Patent No.: US 6,510,062 B2
(45) Date of Patent: Jan. 21, 2003

(54) METHOD AND CIRCUIT TO BIAS OUTPUT-SIDE WIDTH MODULATION CONTROL IN AN ISOLATING VOLTAGE CONVERTER SYSTEM

(75) Inventors: Dimitry Goder, San Jose, CA (US); Steven Cartier, Morgan Hill, CA (US)

(73) Assignee: Switch Power, Inc., Campbell, CA (US)

( * ) Notice: Subject to any disclaimer, the term of this patent is extended or adjusted under 35 U.S.C. 154(b) by 0 days.

(21) Appl. No.: 09/888,967

(22) Filed: Jun. 25, 2001

(65) Prior Publication Data

US 2002/0196642 A1 Dec. 26, 2002

(51) Int. Cl.$^7$ .................. H02M 3/335; H02M 5/42; H03K 3/01
(52) U.S. Cl. .................. 363/21.11; 307/296.2; 363/89
(58) Field of Search ............ 363/21.11, 21.12, 363/20, 37, 41, 89, 53, 60; 307/297, 296.2

(56) References Cited

U.S. PATENT DOCUMENTS

| | | | |
|---|---|---|---|
| 4,439,821 A | * 3/1984 | Grippe | 363/26 |
| 4,454,571 A | * 6/1984 | Miyashita | 363/60 |
| 4,599,685 A | 7/1986 | Hombu et al. | |
| 4,626,979 A | * 12/1986 | JaQuay | 363/41 |
| 4,701,637 A | * 10/1987 | Piro | 307/297 |
| 4,739,191 A | * 4/1988 | Puar | 307/297 |
| 5,173,847 A | 12/1992 | Suzuki | |
| 5,179,296 A | * 1/1993 | Ito | 307/296.02 |
| 5,192,905 A | 3/1993 | Karlin et al. | |
| 5,528,483 A | 6/1996 | Mohandes | |
| 5,600,551 A | 2/1997 | Luscher, Jr. | |
| 5,621,628 A | 4/1997 | Miyazaki et al. | |
| 5,801,933 A | 9/1998 | Ravid | |
| 6,111,769 A | * 8/2000 | Zhang et al. | 363/127 |
| 6,191,965 B1 | 2/2001 | Matsumoto | |
| 6,208,534 B1 | 3/2001 | Shteynberg et al. | |

* cited by examiner

*Primary Examiner*—Rajnikant B. Patel
(74) *Attorney, Agent, or Firm*—Dorsey & Whitney LLP

(57) ABSTRACT

The output-side referenced pulse width modulator (PWM) in an isolation-providing voltage converter receives at least initial bias voltage (Vbias) from a charge-pump like Vbias generator. The Vbias generator includes an input-side referenced periodic waveform generator whose output signal can be amplified differentially with an input-side referenced circuit and then AC-coupled via isolation-maintaining capacitors to an output-side referenced rectifier circuit whose output is Vbias. The Vbias thus generated can power the PWM at least from power-up through commencement of steady-state operation, when a more robust Vbias can be derived from the output-side voltage itself. Since the PWM is output-side referenced, high feedback bandwidth is maintained.

22 Claims, 7 Drawing Sheets

METHOD AND CIRCUIT TO BIAS OUTPUT-SIDE WIDTH MODULATION CONTROL IN AN ISOLATING VOLTAGE CONVERTER SYSTEM

FIELD OF THE INVENTION

The present invention relates generally to isolation-providing voltage converters having isolated input and output grounds, and more particularly to such voltage converters with isolated input and output grounds that employ an output-side pulse width modulator controller.

BACKGROUND OF THE INVENTION

Voltage converters receive an input voltage (Vin) that is AC in an AC:DC power converter, or DC in a DC:DC power supply, and generate one or more output voltages (Vo1, Vo2) therefrom. The output voltages may be greater than Vin or less than Vin, and may be AC or DC although commonly the converter output voltage Vo1, Vo2 will be rectified. However, as used herein, in the broadest sense "voltage converter" can include an AC:AC converter, an AC:DC converter, a DC:DC converter, or a DC:AC converter, wherein each of the converter types provides isolation between input-side ground and output-side ground, and may be implemented using different topologies.

FIG. 1A depicts a prior art isolation-providing voltage converter, here a DC:DC power converter 10 that converts an input voltage (Vin) to a rectified DC output voltage Vo1. A load (not shown) will be coupled between Vo1 and output ground. Although FIG. 1A actually depicts generation of a single output Vo1, it is understood that more than one output voltage could be generated, and that each such output voltage could be of a different magnitude. System 10 could be an AC:DC power converter, in which case Vin would represent an input AC voltage after it has been rectified for presentation to converter 10. System 10 could also be an AC:AC power converter or a DC:AC converter, in which case the output side lowpass filtering components may be omitted.

Converter 10 provides isolation in that there is an input side ground and an output side ground, with isolation between the two grounds. Converter 10 may thus be said to have a primary or input side 20 that receives operating potential Vin relative to an input-side ground. Converter 10 also has a secondary or output side 30 that outputs potential Vo1 relative to a secondary-side ground.

In the exemplary topology of FIG. 1A, isolation between input side 20 and output side 30 is maintained by transformer T1 and by an isolation mechanism I1. Transformer T1 typically comprises at least one primary winding W1 and at least one secondary winding W2, etc. from which raw output voltage is provided. Isolation mechanism I1 may include optical transmitter-receiver pairs, sampled signal, transformed-coupled circuits and the like.

The input side of converter 10 includes a switch Q1 coupled in series between an end of a primary transformer winding and input-side ground (or other input-side reference potential). While FIG. 1A depicts switch Q1 coupled in series between W1 and ground, it is understood that the roles of Vin and ground could be reversed, e.g., Q1 could instead be coupled between the Vin node and winding W1. If additional primary side windings are present, each such winding will have a switch such as Q1, also coupled between an end of the winding and input side ground (or other input-side reference potential, perhaps Vin).

In a fashion well known to those skilled in the relevant art, each switch Q1 opens and closes in response to a drive signal from a drive circuit 50. Drive circuit 50 functions in response to input from a pulse width modulator (PWM) circuit 60, which itself operates preferably in response to feedback 70 from the generated output-side voltage(s), here Vo1. Typically the output side of system 10 will compare Vo1 to a stable reference voltage derived from Vo1 and generate a correction signal to PWM 60, which correction signal is represented by feedback loop 70. When circuit 50 outputs a drive signal causing Q1 to turn-on, Q1 closes and Vin is impressed across the input or primary transformer winding W1, and essentially Vin is sampled or chopped. The resultant chopped signal is inductively coupled via transformer T1 to the secondary transformer winding W2.

With the specific topology shown in FIG. 1A, on the output side, diode D1 and lowpass filter L1-C1 rectify and filter the signal to yield an output DC voltage, Vo1. (Of course other output side topologies and/or rectification configurations could instead be used.)

The magnitude of Vo1 may be altered by changing duty cycle of the drive signal provided by circuit 50 to switch Q1, which is to say by pulse width modulating the drive signal output from circuit 50. In the configuration shown, drive signal PWM changes are responsive to a signal or signals from PWM 60 in response to a feedback signal via feedback path 70. As a result, circuit 50 can make compensating changes in the drive signal delivered to the input of switch Q1. For example, if the load or other factors cause Vo1 to decrease, feedback via path 70 can cause PWM circuit 60 to drive circuit 50 to increase duty cycle of the drive signal to switch Q1 to increase magnitude of Vo1.

In FIG. 1A, driver circuit 50 and PWM circuit 60 are referenced to the input side of converter 10, which is to say these circuits are directly coupled to input-side ground. A practical consideration for circuit 50 and PWM circuit 60 is establishing a bias operating potential, Vbias, to ensure that these circuits can operate as soon as Vin is provided to converter 10. For the input side configuration shown in FIG. 1A, providing bias voltage is straightforward. Among other techniques, Vbias may be directly derived from Vin, for example using a circuit 40 comprising Zener diode Vz, current-limiting resistor R1, and filter capacitor C1. Another approach is to obtain a bias potential from a primary winding on T1, which Vbias approach is suggested by a phantom line in FIG. 1A. Generating input-side Vbias is relatively straightforward for the topology of FIG. 1 because Vin, drive circuit 50, and PWM 60 are each referenced to input-side ground.

But although providing an input-side referenced control circuit 50 and PWM circuit 60 enables a simplified Vbias biasing circuit to be used, it is necessary to include an isolation mechanism I1 to isolate the output-side ground signals from the input-side grounded PWM circuit 60. In addition to adding implementation cost and bulk to system 10, isolation components (e.g., optical transmitter-receiver pairs, transformed-coupled circuits and the like) tend to reduce useful feedback bandwidth. By way of example, optical transmitter-receiver pairs used for I1 tend to limit feedback bandwidth of loop 70 to perhaps 5 KHz. Understandably large feedback bandwidth is desired to ensure a more rapid correction of Vo1, preferably at least 20 KHz.

System 10 in FIG. 1B is somewhat similar to what was shown in FIG. 1A except that pulse width modulation circuit 60 is now referenced to the output-side of voltage converter 10. In this configuration, advantageously no isolation components are required between Vo1 and the input to PWM circuit 60 as the PWM circuit is also now referenced to output-side ground. The absence of isolating elements between Vo1, and PWM 60 can maintain a high feedback bandwidth. Unfortunately, however, it is now necessary to provide isolation I1, I2 between the output of PWM circuit 60 and the input to drive circuit 50, since the input components are referenced to input-side ground. As a result, providing Vbias to PWM circuit 60 is complicated by the necessity to include isolation, shown here as I2. Isolation I2 typically is implemented with a chopper switch (indicated as Q2) and an AC-coupled isolating transformer and output-side rectifier. Isolation I1 may be similarly implemented, or may instead use optical isolating devices. A practical consideration in implementing I2 is the necessity to comply with U.L. isolation requirements, as I2 spans between the input-side ground and the output-side ground portions of voltage converter system 10.

Thus in an isolating or isolation-providing voltage converter, although it is advantageous to use an output-side referenced PWM circuit 60 to maintain high feedback gain and ease of output-side connections, such configurations complicate generating Vbias potential to ensure that circuit PWM 60 will function as soon as Vin is applied. Also, as shown in FIG. 1B, an output-side referenced PWM circuit 60 requires isolation I1 to provide a drive signal to the input-side driver circuit 50, whose output drives switch Q1. As I1 does not deliver substantial power, I1 typically can be implemented with optical transmitter-receiver pairs, sampled signal, transformed-coupled circuits and the like.

There is a need for a voltage converter topology that advantageously provides the high gain and relative simplicity of output-side referenced control and pulse width modulation circuitry, while overcoming the problems in the prior art associated with generating Vbias potential for such circuitry.

The present invention provides such topology and a method of implementation.

SUMMARY OF THE INVENTION

The present invention provides a Vbias voltage generator to provide at least initial operating potential for an output-ground reference pulse width modulator (PWM) circuit in a voltage converter. The Vbias generator operates similarly to a charge pump and includes a waveform generator that operates from the converter's Vin input potential and outputs a periodic signal. The periodic signal may be a pulse train, a sinusoid, or other periodic waveform. The periodic signal is preferably input to an input-side referenced circuit that can amplify and output the signal with a complementary version of the signal. At this juncture, the periodic signal may be single-ended or differential. The signal from the circuit is AC-coupled through isolating capacitors to a rectifier circuit that is referenced to output-side ground and whose output is Vbias potential. The rectified Vbias potential at the output-side is coupled to the output-side PWM as the start-up Vbias potential, to ensure the PWM operates properly from application of Vin potential to the converter.

A more robust source of Vbias for the PWM may be generated from a secondary winding on the converter transformer. This potential is rectified and is also applied to the Vbias node of the PWM. During the initial perhaps 10 ms of application of Vin (e.g., from power-up) to the converter, the Vbias potential is provided by the Vbias generator. After that time duration the PWM will be operating normally and Vbias may be then obtained from the extra winding on the power transformer. If desired, the Vbias generator can be turned-off once the voltage converter reaches steady-state, e.g., after about 10 ms.

The output-side referenced PWM obtains feedback information directly from the voltage converter output(s) and can thus preserve high loop bandwidth. The output from the PWM may be coupled to a conventional drive circuit using a prior art isolator, for example a transformer circuit.

Other features and advantages of the invention will appear from the following description in which the preferred embodiments have been set forth in detail, in conjunction with the accompanying drawings.

DETAILED DESCRIPTION OF THE PREFERRED EMBODIMENTS

Figure 2A:
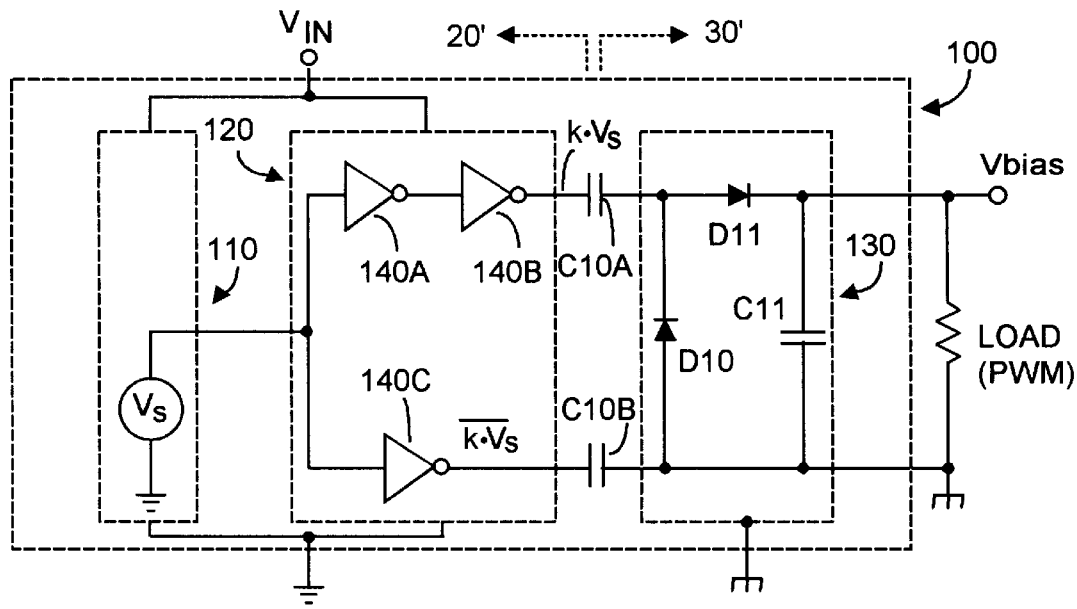
FIG. 2A depicts an exemplary isolating complementary-drive Vbias generator for use with an isolating voltage converter having an output-side referenced pulse width modulator circuit, according to the present invention.

FIG. 2A depicts an isolation-providing bias voltage generator 100 that receives Vin operating potential, and generates a Vbias potential for use with an isolating voltage converter to ensure at least power-up Vbias to a pulse width modulator (PWM) circuit. Overall, generator 100 may be referred to as a charge-pump type circuit. Generator 100 comprises an input-side referenced waveform generator 110 whose output signal is input to input-side referenced circuit 120. The output from circuit 120 is AC-coupled via capacitors 10A, 10B to a rectifier circuit 130, whose output is a Vbias potential referenced to output-side ground. It is noted that input side 20' of generator 100 is referenced to input-side ground, and that output side 30' is referenced to output side ground, with AC-coupling capacitors C10A, and C10B providing an isolation function. Capacitors C10A, C10B preferably are off-the-shelf components whose breakdown voltage rating at least exceeds U.L. "Y-cap" isolation requirements, e.g., 1.5 KV breakdown. Exemplary values for these capacitors may be in a range from about 100 pF to perhaps 300 pF, although other values could be used.

Providing Vbias generator 100 with input-side output-side circuit isolation using capacitors C10A and C10B offers many advantages over prior art techniques. The capacitors provide wider bandwidth than optical photo-voltaic isolator devices. The capacitors are easier to implement compared to isolating transformers. The capacitors are relatively inexpensive and can provide higher performance reliability than optical or transformer type isolating devices.

With a Vin potential of about 5 VDC, generator 100 can output a Vbias of about 8.1 VDC with a load current of about 160 μA, where C10A and C10B are 220 pF, and C11 is 10 μF. In practice, this Vbias output can be sufficient to start normal operation of a PWM for at least about 5 ms, or other sufficient time duration for the PWM to enable the associated voltage converter to commence normal steady-state operation. Once normal steady-state operation commences, a more robust source of Vbias may be obtained from the voltage converter output itself, and the Vbias generator can be turned off to conserve quiescent operating power.

In FIG. 2A, waveform generator 110 creates a periodic signal Vs(t) with peak-peak amplitude Vs, which signal is referenced to input-side ground and is input to circuit 120. The period or frequency and waveform characteristics of the Vs(t) signal are not critical, and the signal may be a pulse train waveform, a sinusoidal waveform, or some other periodic waveform. In the exemplary embodiment of FIGS. 2A–2C, generator 110 creates a periodic signal that is a pulse train. For example, using the exemplary generator circuit of FIG. 2C, a signal frequency of a few MHz and a duty cycle of about 50% is readily generated with a Vs amplitude of a few VDC, although precise frequency and/or duty cycle are not critical.

In the configuration of FIG. 2A, circuit 120 receives the V(t) signal output from generator 110 and provides differential amplification using inverters 140A, 140B, 140C. In practice, inverters 140A, 140B, 140C may be gate circuits on a common HCMOS integrated circuit operated from a low current source of power Vin≈5 VDC. Circuit 120 thus outputs k·Vs and its complement, where coefficient k represents an amplitude factor. For example, if Vin is about 5 VDC, even if the Vs(t) signal is only a few volts peak-peak, the gain provided by inverters 140A, 140B, 140C will result in an approximately 5 V peak-peak amplitude for the complementary signals output by circuit 120.

The complementary signals are AC-coupled via isolation-providing capacitors C10A, C10B to rectifier circuit 130, a circuit that is referenced to output-side ground. In the configuration shown, rectifier circuit 130 includes diodes D10, D11 and filter capacitor C11, although other rectifier circuits could be used. Capacitor C11 integrates charge current from capacitors C10A, C10B and contributes to the low pass filtering of k·Vs(t) and its complement, while acting as a bulk storage charge reservoir. An exemplary value for C11 might be a 10 μF tantalum capacitor, although other values could be used. The desired Vbias potential appears across capacitor C11 at the Vbias node. The Vbias voltage will be provided as at least a start-up or power-up Vbias potential for a PWM load within an isolating voltage converter. It is to be appreciated that in addition to creating the a bias potential, the Vbias generator 100 spans the input-side to output-side of voltage converter while providing isolation via capacitors C10A and C10B. Collectively the overall Vbias generator 100 functions similarly to a charge-pump amplifier system in that the magnitude of Vbias can exceed the magnitude of the generator signal Vs(t), and preferably is greater than the magnitude of Vin. Magnitude of the generated Vbias potential depends upon several factors including repetition rate and duty cycle of Vs(t) provided by generator 110, capacitance of C10A, C10B, and magnitude of the load coupled to the Vbias node. In practice, the load is the power-up current required by the PWM for which Vbias generator 100 provides start-up bias potential. It is again noted that although the preferred embodiment of generator 110 develops a periodic pulse signal, non-pulse waveform signals could instead be generated, including sinusoidal, near-sinusoidal, or other periodic waveforms.

Figure 2B:
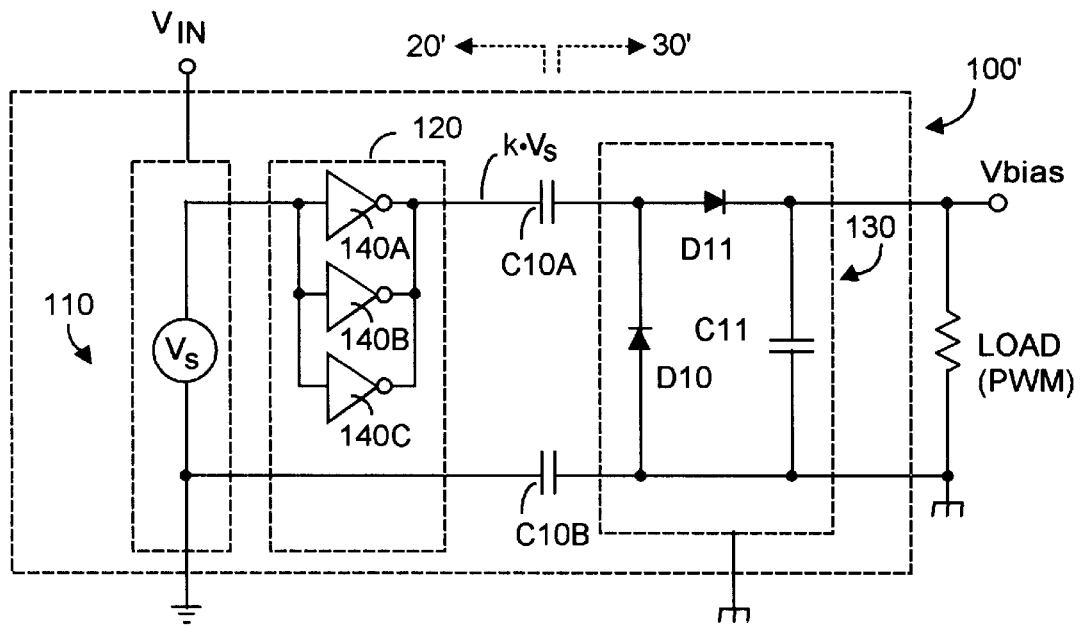
FIG. 2B depicts an exemplary isolating single-ended Vbias generator for use with an isolating voltage converter having an output-side referenced pulse width modulator circuit, according to the present invention.

In some applications it may be unnecessary to differentially amplify the peak-peak magnitude of the periodic Vs(t) signal from generator 110. FIG. 2B shows a single-ended Vbias generator 100' that has some similarity to the configuration of FIG. 2A. In FIG. 2B, circuitry 120 essentially outputs a single-ended amplitude-enhanced signal k·Vs and is implemented using a single gate or more preferably three parallel-coupled gates 140A, 140B, 140C. The parallel-coupling depicted enables circuit 120 to drive more current than if a single gate or inverter were used. Similar to the configuration of FIG. 2A, isolation capacitors C10A, C10B again span the input-side and the output-side of Vbias generator 100', although capacitor C10B now spans input-side ground to output-side ground. Capacitor C10A and C10B AC-couple the Vs(t) signal from generator 110 to rectifier circuit 130, which may be (but need not be) identical to circuit 130 described with respect to FIG. 2A. It is noted that for the same Vs(t) signal, the same Vin potential, the same capacitors C10A, C10B and the same PWM load, the configuration of FIG. 2A can output essentially twice the power that is available from the configuration of FIG. 2B by simply using inverters 140A, 140B, 140C in a different configuration. It will be appreciated that inverters 140B and 140C in FIG. 2B could in fact be parallel-coupled gates, to enhance current drive capability of circuit 120.

Figure 2C:
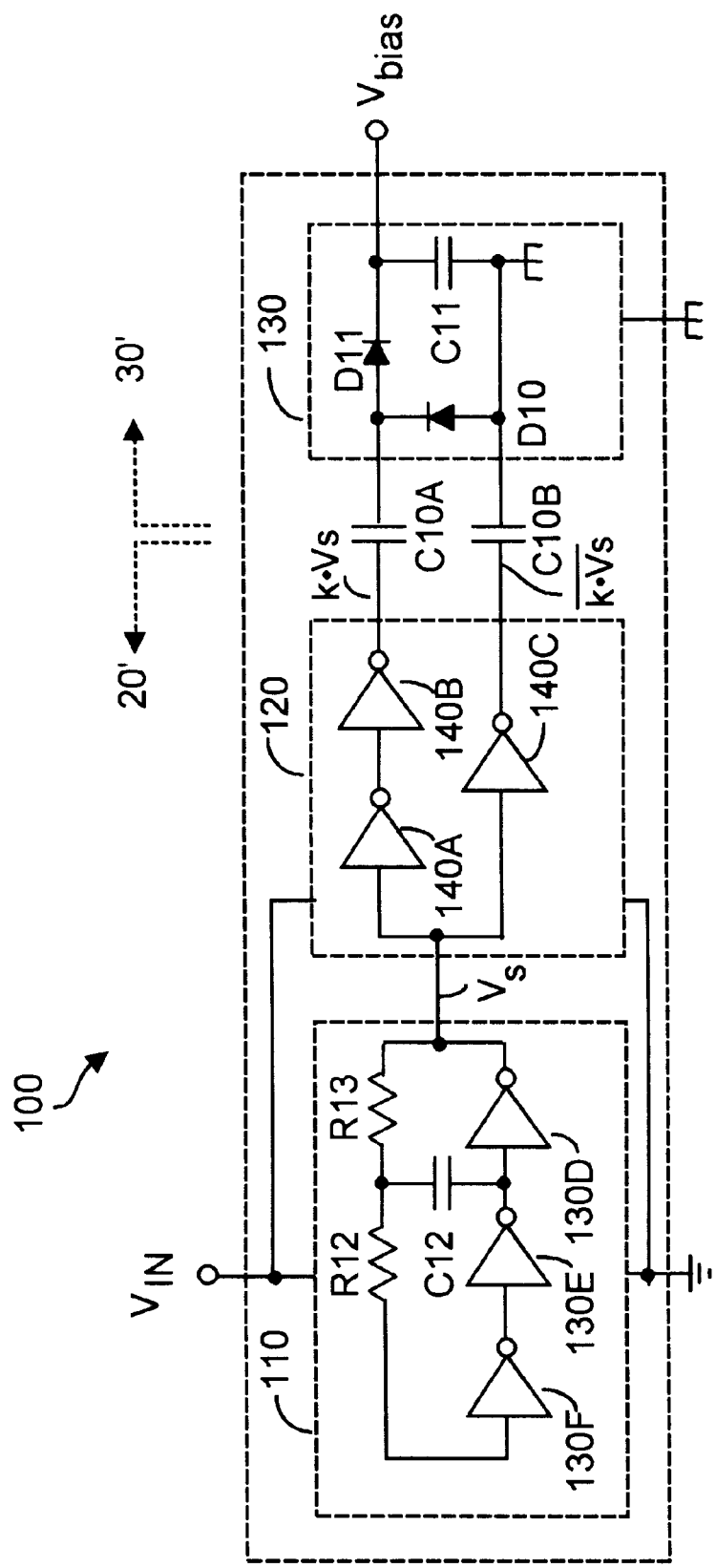
FIG. 2C depicts an exemplary waveform generator circuit useable with the Vbias generator circuits of FIG. 2A and FIG. 2B, according to the present invention.

As shown in FIG. 2C, signal generator 110 can be implemented with resistors R12, R13, a timing capacitor C12, and with inverter gates 140D, 140E, 140F, such as those used in circuit 120. Oscillation frequency is determined by R12, R13, C12 and the intrinsic inverter gate delays. If desired, all inverter gates 140A, 140B . . . 140F could all be provided from a single HCMOS logic IC. With C10A and C10B each about 220 pF, clock generator 110 will oscillate at perhaps 2 MHz, although precise frequency control is not critical. In practice, an oscillation frequency of perhaps 500 KHz to about 5 MHz would be acceptable, although lower or higher clock frequencies are also possible.

In FIG. 2C, the Vs(t) periodic signal output by generator 110 is coupled to circuit 120, which generates complementary and preferably amplitude-enhanced signals that are AC-coupled via isolating capacitors C10A, C10B to rectifier circuit 130. It is again noted that input side 20' of Vbias generator 100 includes generator 110 and circuit 120, each of which is referenced to input-side ground, while output side 30' includes rectifier circuit 130, which is referenced to output-side ground. Capacitors C10A and C10B again provide isolation between the input side and output side of Vbias generator 100.

Figure 3:
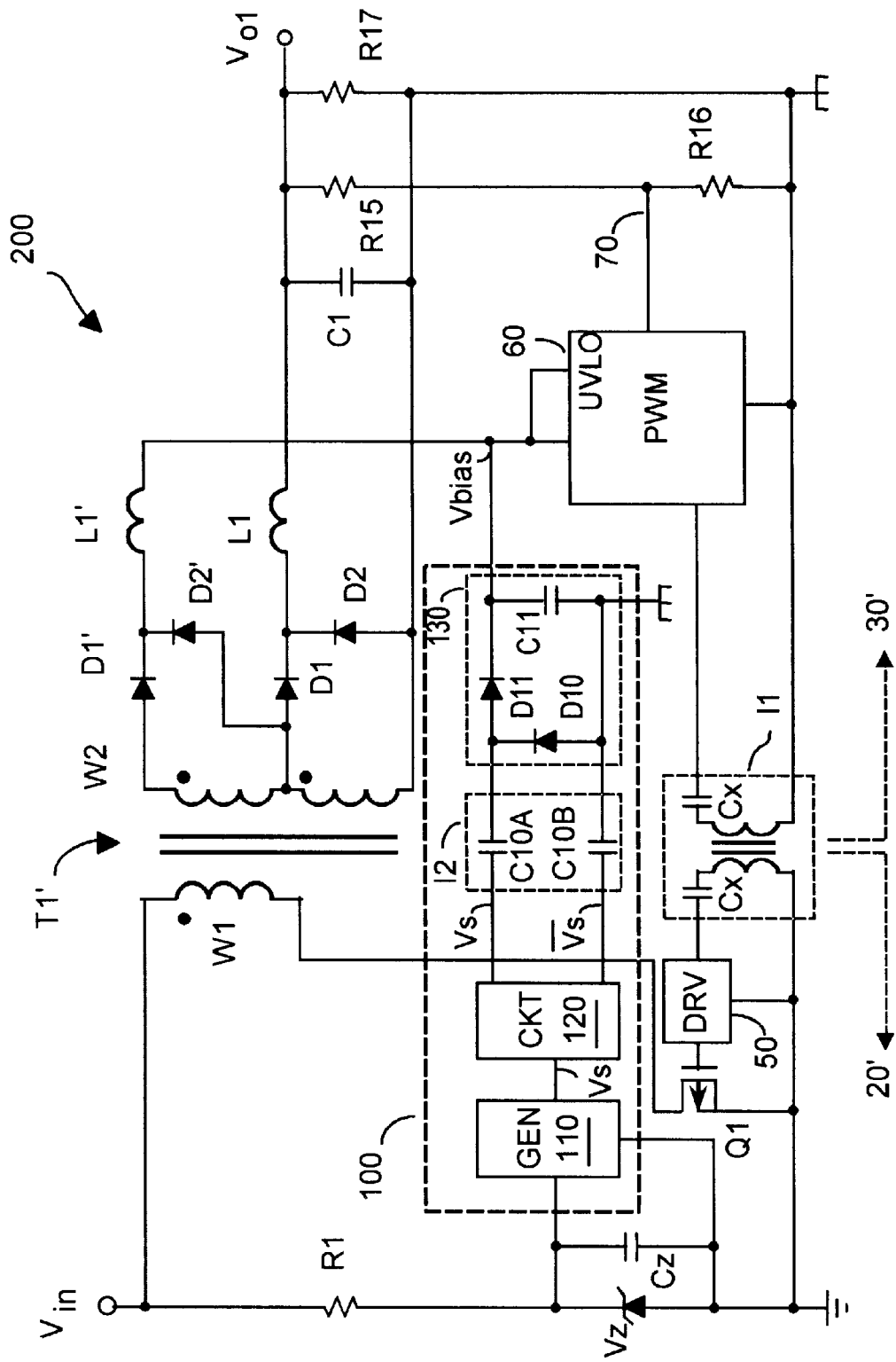
FIG. 3 depicts a generic isolating voltage converter with an output-side referenced pulse width modulator with an isolating Vbias generator, according to the present invention.

FIG. 3 depicts an isolated voltage converter system 200 that has an input side 20, an output side 30, and that includes an output-side referenced PWM 60 and an input-side referenced Vbias generator 100, according to the present invention. In the configuration of FIG. 3, output-side referenced PWM 60 receives at least a start-up Vbias potential from input-side referenced Vbias generator 100. Note that part of the demarcation between input and output sides 20 and 30 now occurs through isolating capacitors C10A, C10B (which collectively may be noted as isolator I2), with transformer T1' and isolation device I1 also preserving isolation between input and output sides of system 200. For ease of illustration, system 200 is shown as a DC:DC converter that has a single input winding W1 coupled in series with a single switch Q1, and that outputs a single rectified output voltage Vo1. However for purposes of the present invention, it is understood that system 200 may be an AC:AC, AC:DC, DC:AC, or DC:DC isolation-providing converter that may have multiple outputs, and that many topologies may be used to implement any of the isolating converters with which the present invention may be used.

Input-side referenced Vbias generator 100 includes a generator 110 that provides a periodic signal Vs that is input to circuit 120. In FIG. 3, generator 110 preferably has the same configuration as shown in FIG. 2C, although other generator circuits may be used. As was described with respect to 2A and 2C, circuit 120 receives and preferably outputs an amplified version of Vs and its complement, and couples these two signals via isolation-providing capacitors C10A and C10B to rectifier circuit 130. Rectifier circuit 130, which may be identical as that described with respect to FIGS. 2A–2C, outputs a bias voltage Vbias across capacitor C11, which is referenced to output-side ground. The Vbias potential, available at the Vbias node of generator 100, provides at least the start-up Vbias potential to output-side referenced PWM 60. Overall, it will be appreciated that Vbias generator 100 provides a rather elegant but simple input-side referenced Vbias generator for an output-side referenced load, e.g., PWM 60.

Vbias generator 100 and C10A, C10B is designed to power PWM 60 immediately after power-up (e.g., application of operating potential Vin) but could also be designed to provide Vbias potential at all times thereafter. However, in the embodiment shown, after power-up, once system 200 attains steady-state, a more robust source of Vbias is derived from the secondary output voltage that is rectified by diodes D1', D2' and inductor L1' and coupled to PWM 60.

Note that input-side Vbias generator 100 may be implemented as described with respect to FIGS. 2A–2C. Operating potential for the Vbias generator 100 is readily available from the input side of system 200, for example, using a Zener diode Vz to reduce Vin, if necessary, to power generator 100. Again, alternative mechanisms to provide an input-side referenced operating potential for generator 100 may be implemented, including rectifying pulses derived from the W1 winding and Vin. In any event, powering Vbias generator 100 is relatively straightforward because Vin and generator 100 are both referenced to input-side ground.

At power-up, PWM 60 will remain in a so-called under UVLO mode (voltage local output) or sleep mode and will draw a very small amount of current (typically less than 100 $\mu$A or so) until the magnitude of Vbias present at the UVLO node on the PWM exceeds a threshold, for example +8 VDC. When the UVLO threshold has been exceeded, PWM 60 exits the sleep mode and becomes fully active, and will begin to draw appreciable operating current, typically tens of mA. It is a function of a Vbias generator 100 according to the present invention to ensure that sufficient magnitude of Vbias is presented to PWM 60 from time of power-up to at least when the UVLO threshold is exceeded. Once the UVLO threshold is exceeded, the PWM becomes fully functional and voltage converter 200 will operate in normal fashion such that a more robust source of Vbias may be taken from the voltage rectified by diodes D1', D2', and inductor L1'. Once the more robust source of Vbias is operating, generator 100 can be allowed to continue to output voltage, or it may safely be turned-off, thus saving some operating power.

Figure 4:
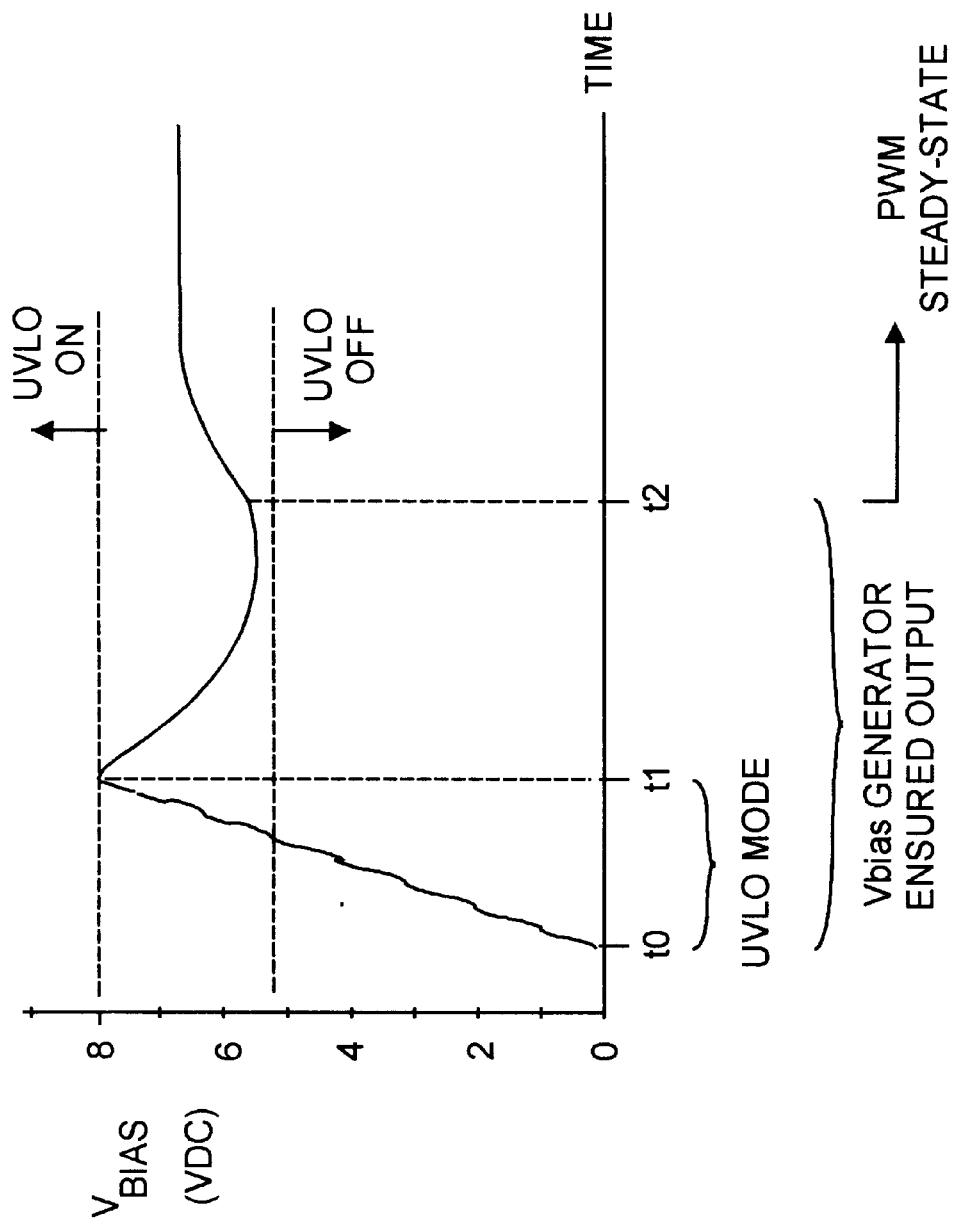
FIG. 4 depicts an exemplary waveform showing Vbias vs. time for the configuration of FIG. 3, according to the present invention.

FIG. 4 is an exemplary graph showing Vbias potential, as seen at PWM 60, versus time. Assume that the operating source of potential Vin is coupled to system 200 at time $t_0$. After a time delay proportional to R1 and Cz, operating potential Vz will be coupled to Vbias generator 100. Vbias generator 100 will begin to output a Vbias potential in charge-pump fashion, as has been described herein and the Vbias potential will appear across C11 and the Vbias node of generator 100. During time $t_0$ to $t_1$, the Vbias potential increases in a ramp-fashion, as shown in FIG. 4.

The UVLO mode time interval ($t_1$–$t_0$) during which PWM 60 draws minimal current may range from perhaps 10 $\mu$S to perhaps 250 ms, depending upon circuit implementation. During time interval ($t_2$–$t_1$), typically about a few $\mu$S to perhaps 10 ms or so, PWM 60 leaves the UVLO mode and begins to draw appreciable current in the active mode. In the active mode, increased PWM current drain causes a decrease in the Vbias magntiude between time $t_2$ and time $t_1$, as shown in FIG. 4. But during this interval, preferably the more robust Vbias source begins to provide current to PWM 60, such that by time $t_2$ steady-state operation of PWM 60 and voltage converter 200 commences.

Thus, the Vbias generator should ensure sufficient magnitude of Vbias potential commencing with time $t_0$ and continuing to at least time $t_2$, a duration of perhaps 10 $\mu$S to 250 ms or so, with about 10 ms to about 25 ms being a more typical range. In practice, if generator 100 provides a Vs(t) periodic signal with a repetition rate of about 2 MHz, and if values for C10A, C10B are about 220 pF, and C11 is about 10 $\mu$F, Vbias can ensure that ($t_2$–$t_0$) is at least about 20 ms, where PWM 60 draws perhaps 200 $\mu$A in sleep mode. As noted, once the UVLO threshold is exceeded, e.g., at about 8 VDC for the exemplary graph of FIG. 4, PWM 60 becomes fully active, system 200 will begin to convert voltage and output voltage rectified by D1', D2', L1' can now be used as a more robust source of Vbias.

Referring again to FIG. 3, once PWM 60 is operating in steady-state mode, e.g., from and after time $t_2$, the pulse train provided to drive circuit 50 may be sensed and used to terminate further oscillation of generator 110 in Vbias generator 100, to conserve power. On the other hand, the Vbias generator could be designed to power the PWM 60 at all times, even under the heavier current loading that occurs after the UVLO threshold has been exceeded, without using a more robust Vbias source. In such a design, capacitors C10A, C10B would have to provide the steady-state current requirements of PWM 60, for example 20 mA. The capacitance of capacitors C10A, C10B would have to be increased substantially from the exemplary 220 pF design value described, since capacitor current increases linearly with C·dV/dt. The large values of C10A, C10B required could render the design impractical. Further, the repetition rate of the periodic Vs(t) signal from generator 110 would have to be increased for a given value of Vin power supply.

As shown in FIG. 3, PWM 60 receives as an input a feedback signal 70 that is a fraction of Vo1, the fraction determined by the magnitude of divider resistors R15, R16. In this fashion, feedback 70 enables PWM 60 to sample the magnitude of Vo1 and, via isolation unit I1, to command oscillator drive circuit 50 to control Q1 switching. In the embodiment of FIG. 3, isolation unit I1 is shown as including a transformer T2 and DC-blocking capacitors Cx. Other isolation configurations could be used for I1.

Figure 1A:
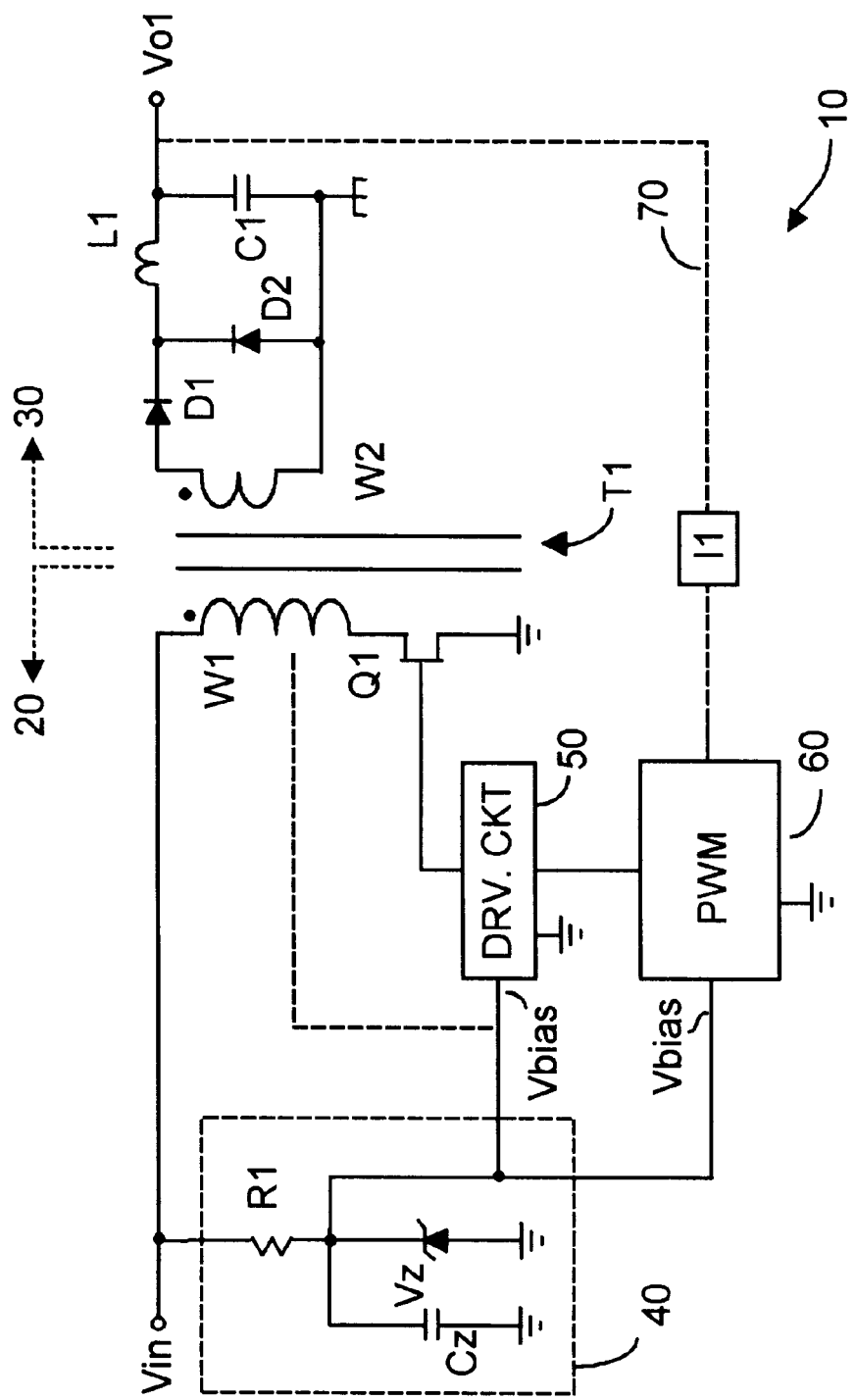
FIG. 1A depicts a voltage converter system with an input-side referenced pulse width modulation circuit, according to the prior art.
Figure 1B:
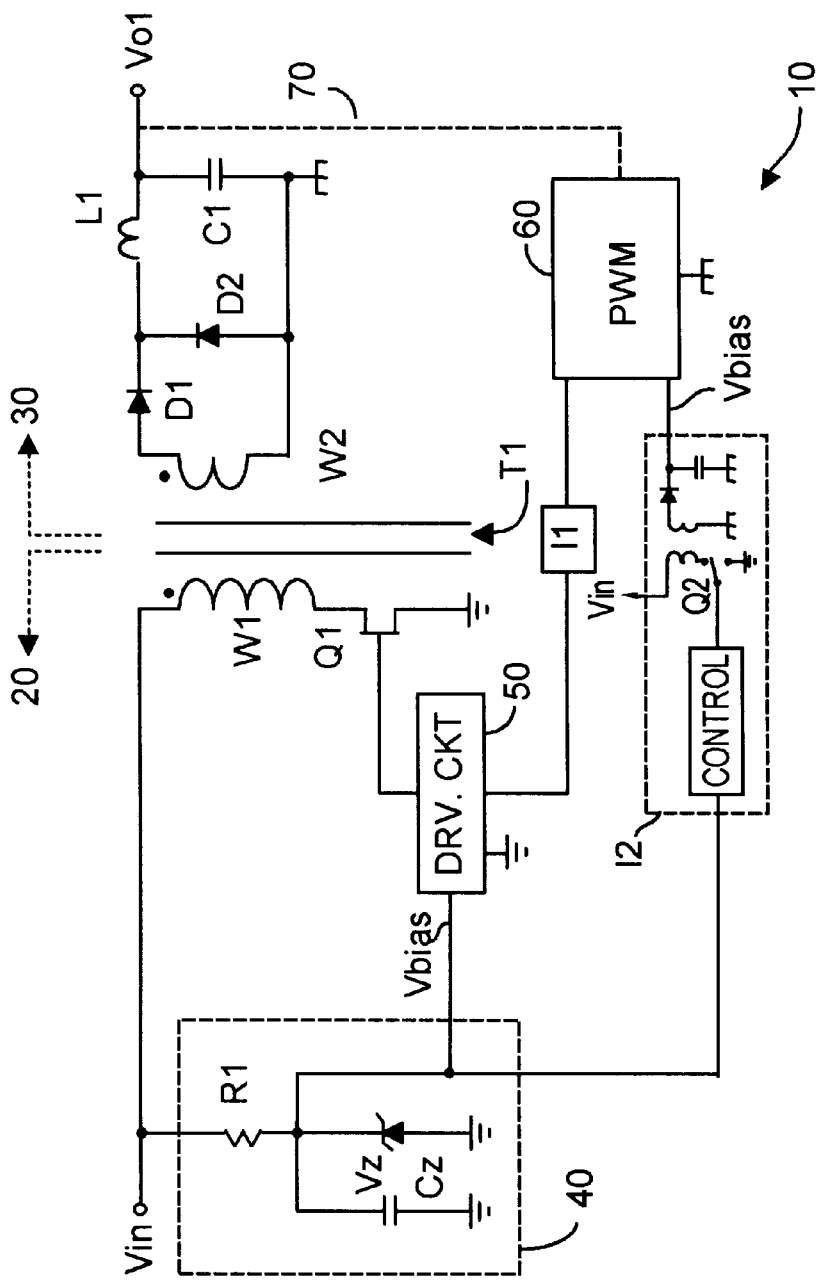
FIG. 1B depicts a voltage converter system with an output-side referenced pulse width modulation circuit, according to the prior art.

Note that feedback loop 70 advantageously does not include isolation devices. Thus, use of the present invention can preserve high bandwidth in the feedback loop, preferably at least 20 KHz and in some applications as high as perhaps 100 KHz. Using this feedback information, PWM 60 rapidly determines what driver signal should be applied to switch Q1 (or additional switches if multiple primary windings are present as were shown in FIGS. 1A, 1B). PWM 60 then so commands driver circuit 50, via I1. Commonly, the feedback control signal output by PWM 60 will command a duty cycle for Q1 switching that may be perhaps 3% to 90% or so, depending upon the specific design requirements for converter 200.

Figure 5:
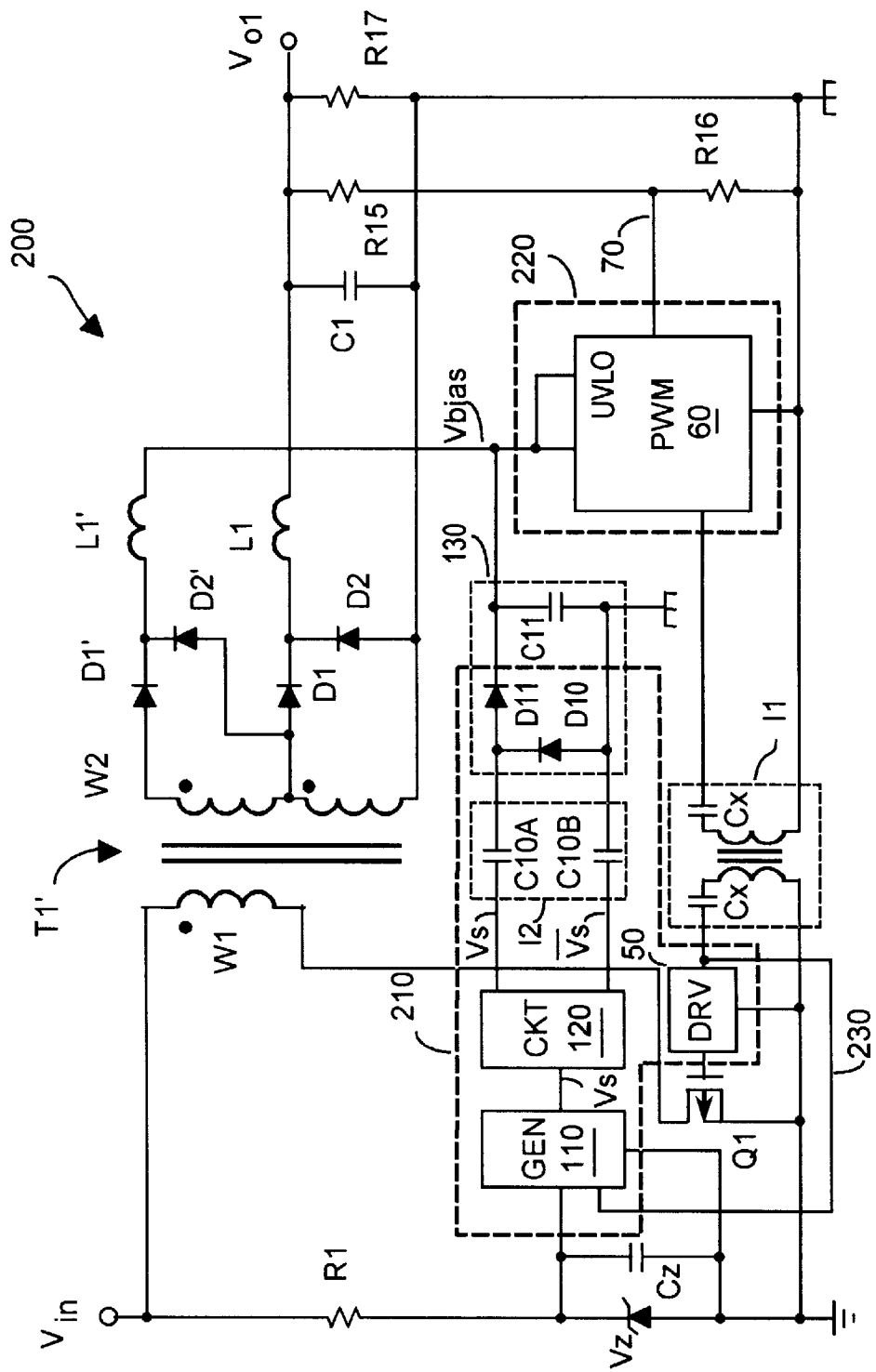
FIG. 5 depicts an integrated circuit that includes most of the components comprising an isolating Vbias generator, according to the present invention.

Referring now to FIG. 5, it will be appreciated that most of the components comprising Vbias generator 100 may be implemented on a single IC 210. For example, IC 210 may include waveform generator 110, circuit 120, isolating capacitors C10A, C10B, and rectifier diodes D10, and D11, as well as switch drive circuit 50. Normally PWM 60 would be fabricated on a separate IC 220, as it is output-side referenced. One could provide IC 210 and IC 220 within a single package providing sufficient spaced-apart distance was maintained between the two ICs to comply with U.L. high voltage breakdown specifications.

FIG. 5 also shows an optional connection 230 between the input-side referenced version of drive pulses commanded by PWM 60 in steady-state operation, and waveform generator 110. These pulses can be used to terminate operation of Vbias generator 100 once converter 200 attains steady-state operation. It is understood that termination of Vbias generator 100 may be accomplished in other ways, and that termination does not require that components shown as being on a common IC 210 must in fact be on a common IC.

To recapitulate, isolating voltage converters, be they AC:DC, DC:AC, AC:DC, or DC:DC have an input-side ground, an output side ground, and one or more isolation-providing components that bridge between the input side and the output side. Regardless of the type of voltage converter or its specific topology, the present invention provides an isolating-Vbias generator that is powered from the input-side ground Vin power supply yet outputs a Vbias voltage referenced to output-side ground. The Vbias generator includes a generator that provides a periodic waveform that is AC-coupleable via isolating capacitors to an output-side referenced rectifier. The output-side rectified voltage is used as at least a start-up Vbias potential for a PWM that is referenced to the output-side ground. An output-side ground PWM advantageously requires no feedback isolation elements, thus preserving high feedback bandwidth. At power-up, the output-side PWM is ensured start-up Vbias from the Vbias generator, yet the isolation components are merely two relatively small capacitors. Once the PWM begins to function in steady-state, a more robust Vbias derived from the output voltage of the converter can supplement or replace the Vbias generator created voltage.

Modifications and variations may be made to the disclosed embodiments without departing from the subject and spirit of the invention as defined by the following claims.

What is claimed is:

1. A bias generator for use with an isolating voltage converter having a transformer with an input-side winding coupleable between a source of input-side referenced Vin and an input-side referenced switch, and with an output-side winding from which an output-side referenced potential Vo is derived, the converter further having an output-side referenced pulse width modulator (PWM), biasable by said bias generator, coupled to sample Vo and to control operation of said switch without requiring intervening rectification, said bias generator comprising:

an input-side referenced waveform generator, coupleable to said Vin, outputting a periodic signal;

an output-side referenced rectifier circuit;

first and second capacitors, each coupled between a node of said waveform generator and said rectifier circuit;

wherein a potential appearing at said rectifier circuit is an output-side referenced Vbias potential coupleable to said PWM.

2. The bias voltage generator of claim 1, further comprising:

a circuit, coupled between said waveform generator and said capacitors, having at least one characteristic selected from a group consisting of (a) said circuit increases amplitude of said periodic signal, and (b) said circuit outputs said periodic signal and a complementary version thereof.

3. The bias voltage generator of claim 1, wherein said voltage converter has a characteristic selected from a group consisting of (a) said converter is an AC:DC converter, (b) said converter is an AC:AC converter, (c) said converter is a DC:AC converter, and (d) said converter is a DC:DC converter.

4. The bias voltage generator of claim 1, wherein each of said capacitors has a breakdown voltage exceeding U.L. Y-cap rating.

5. The bias voltage generator of claim 1, wherein said waveform generator has at least one characteristic selected from a group consisting of (a) said periodic waveform has a frequency in a range from about 100 KHz to about 50 MHz, (b) said waveform is a pulse train, (c) said waveform is sinusoidal, and (d) said waveform has a duty cycle between about 3% and about 95%.

6. The bias voltage generator of claim 2, wherein at least one of said waveform generator and said circuit is implemented using a hex-inverter integrated circuit.

7. The bias voltage generator of claim 1, wherein magnitude of said Vbias exceeds about 3 VDC for about 100 µs to about 500 ms, commencing with coupling of said Vin to said converter.

8. An isolating voltage converter, comprising:

a transformer including an input-side winding having a first end coupled to a source of input-side referenced Vin;

an input-side referenced switch coupled in series with said input-side winding and input-side ground;

said transformer further including an output-side winding from which an output-side referenced voltage Vo is derived;

an output-side referenced pulse width modulator (PWM) circuit coupled to sample said Vo and to control operation of said switch without requiring intervening rectification;

a bias voltage generator to bias said PWM, the bias voltage generator comprising:

an input-side referenced waveform generator, coupleable to said Vin, outputting a periodic signal;

an output-side referenced rectifier circuit;

first and second capacitors, each coupled between a node of said waveform generator and said rectifier circuit;

wherein a potential appearing at said rectifier circuit is an output-side referenced Vbias potential coupleable to said PWM.

9. The converter of claim 8, wherein said bias voltage generator further includes a circuit, coupled between said waveform generator and said capacitors, to achieve at least one of increasing amplitude of said periodic signal and converting said periodic signal into a complementary pair of periodic signals.

10. The converter of claim 8, wherein said converter has a characteristic selected from a group consisting of (a) said converter is an AC:DC converter, (b) said converter is an AC:AC converter, (c) said converter is a DC:AC converter, and (d) said converter is a DC:DC converter.

11. The converter of claim 8, wherein each of said capacitors has a breakdown voltage exceeding U.L. Y-cap rating.

12. The converter of claim 8, wherein said waveform generator has at least one characteristic selected from a group consisting of (a) said periodic waveform has a frequency in a range from about 100 KHz to about 50 MHz, (b) said waveform is a pulse train, (c) said waveform is sinusoidal, and (d) said waveform has a duty cycle between about 3% and about 95%.

13. The converter of claim 9, wherein said rectifier circuit includes at least one diode and wherein said waveform generator, said circuit, said capacitors, and said diode are implemented on a common integrated circuit.

14. The converter of claim 8, wherein magnitude of said Vbias exceeds about 3 VDC for about 100 $\mu$s to about 500 ms, commencing with coupling of said Vin to said converter.

15. The converter of claim 8, wherein at least one of said waveform generator and said circuit is implemented using a hex-inverter integrated circuit.

16. The converter of claim 8, further including an output-side referenced circuit to derive from said Vo, once said converter operates in steady-state, a robust Vbias potential, coupled to said PWM.

17. The converter of claim 16, further including means to terminate operation of said bias voltage generator when said converter operates in steady-state.

18. A method of generating a Vbias voltage to bias a pulse width modulator (PWM) in an isolating voltage converter that has a transformer with an input-side winding switchably connectable between a source of input-side referenced Vin and input-side ground;

said transformer further including an output-side winding from which an output-side referenced potential Vo is derived; said converter further having an output-side referenced pulse width modulator (PWM) coupled to sample said Vo and to control switch connection of said input-side winding without requiring intervening rectification, the method comprising the following steps:

(A) generating a periodic signal from a generator operable from said Vin; and (B) coupling said periodic signal to an output-side referenced rectifier circuit using at least a first isolating capacitor and a second isolating capacitor;

wherein an output of said rectifier circuit is a Vbias potential coupleable to bias said PWM.

19. The method of claim 18, wherein step (A) includes generating said periodic signal with at least one characteristic selected from a group consisting of (i) said periodic waveform has a frequency in a range from about 100 KHz to about 50 MHz, (ii) said periodic waveform is a pulse train, (iii) said periodic waveform is sinusoidal, (d) said periodic waveform has a duty cycle between about 3% and about 95%, and (e) said periodic waveform is output as a waveform and a complement thereof.

20. The method of claim 18, wherein:

said voltage converter has a characteristic selected from a group consisting of (i) said converter is an AC:DC converter, (ii) said converter is an AC:AC converter, (iii) said converter is a DC:AC converter, and (iv) said converter is a DC:DC converter.

21. The method of claim 16, wherein magnitude of said Vbias voltage exceeds about 3 VDC for a time interval for about 100 $\mu$s to about 500 ms, commencing with coupling of said Vin to said converter.

22. The method of claim 16, further including means to terminate generation of said Vbias once said converter attains steady-state operation.

* * * * *